Patented Mar. 4, 1941

2,233,867

UNITED STATES PATENT OFFICE 2,233,867

SUSPENSIONS OF SOLIDS AND PROCESS FOR MAKING SAME

Charles S. Howe, Pasadena, Calif., assignor to Industrial Developments, Incorporated, Los Angeles, Calif., a corporation of California No Drawing. Application June 18, 1938, Serial No. 214,602

20 Claims. (Cl. 255—1)

This invention relates to improvements in suspensions of solids and processes for making same. More particularly, this invention relates to aqueous suspensions of finely divided solids such as a drilling mud, in which are included selected calcareous ingredients.

Aqueous suspensions of finely divided solids, for example, muds, slurries, pastes, gels, and the like, are widely used in the arts as plastics, emulsifying agents, bonding agents, coating agents, sealing agents, and the like. A particularly important use is found in their application as drilling mud.

The colloidal properties of such suspensions depend upon the physical and chemical character of the ingredients, and in turn govern the general characteristics of the suspension.

It is one of the objects of this invention to provide ingredients for such suspensions having suitable physical and chemical characteristics for the production of the desired colloidal properties in such suspensions, and to provide a process for the manufacture of suspensions containing these ingredients.

In general, the colloidal properties of such suspensions are profoundly influenced by the presence of alkaline earth ions and certain alkaline earth compounds, as hereinafter set forth.

It is therefore a further object of the invention to provide ingredients for such suspensions comprising suitably ionizing and/or reacting alkaline earth compounds.

The invention may be more clearly understood by referring to a specific illustration, for example, to the use of a drilling fluid such as an aqueous suspension of mud employed in drilling wells. During the drilling of the well, mud is forced to circulate past the cutting bit and allowed to return to the surface. The functions of the mud are many-fold and serve to well illustrate the problem of proper control of the colloidal characteristics of such suspensions. One of the functions of the mud is to pick up the cuttings and transport them to the surface. For this purpose mud of a certain definite viscosity or body is required. On the other hand, the viscosity cannot be allowed to rise too high because of the difficulty in effecting circulation, and also the difficulty of removing entrained cuttings and gas bubbles. This latter difficulty may arise when the mud, following its removal from the drill hole, is being separated from the cuttings, gas bubbles, and other foreign matter, by various methods involving screening, settling, centrifuging, and the like. Following the removal of these impurities, the mud is again pumped to the drill bit, and the mud should be sufficiently low in viscosity to permit easy circulation.

From the foregoing it will be seen that it is desirable that the mud have viscosity between certain minimum and maximum viscosities.

Another function of the mud depends on its thixotropic properties and is of particular importance when the circulation of the mud is stopped for any reason. During the period of quiescence the mud, by virtue of its thixotropic properties, sets up to a gel or quasi-plastic body of relatively high yield point, thus preventing the entrained settlings and cuttings from setting back down the drill hole and jamming the bit or other tool. When circulation, and consequent agitation, is again resumed, the mud rapidly loses its relatively high yield point and returns to its normal viscosity. This thixotropic property of the mud, namely, its ability to set up to a gel of high yield point during quiescence and the rapid disappearance of this gel structure upon reagitation, is to a high degree dependent upon the colloidal character of the suspension.

Another important function which the mud fulfills is the building up of an impervious coating on the structures forming the walls of the hole, thereby preventing the ingress or egress of water or other fluid. The ability to form this coating, or, more particularly, the ability to form a coating which is substantially impervious, is also a function of the colloidal character of the suspension.

When the well is completed, it is frequently desirable to strip the impervious coating from the producing formation. This may be accomplished by "acidization"; that is to say, treatment of the coating with a dilute mineral acid. The ability of the acid to effect such stripping of the coating is dependent upon the ability of the colloidal suspensoids in the coating to be flocculated in the presence of the acid and/or on the presence of certain ingredients in the mud coating which are capable of dissolving in or efferverscing with the acid, for example, carbonates.

Another frequently used function of the drilling mud is to maintain pressure in the hole and prevent blowouts by means of the hydraulic pressure exerted by the long column of drilling mud. To intensify this effect it is frequent practice to add weighting agents to the suspension such as salts which will dissolve in the water, or finely divided solids of high specific gravity. In this latter instance it is of particular importance that the mud have the proper colloidal characteristics to insure suspension of these weighting particles and to prevent their settling out.

Occasionally muds possessing all of the above desired characteristics can be found in nature, for example, the muds from certain sloughs. Again it is sometimes possible to obtain satisfactory mud by mixing with water certain finely comminuted natural earths such as bentonite and other hydrous aluminum silicates. Frequently, however, suitable muds or sources of suitable muds are not available in the vicinity of the drilling project. Under these circumstances recourse is had to synthetic muds or to treatment of naturally available muds to endow them with the desired colloidal properties.

In treating or compounding muds it has been found that the colloidal character of such suspensions is influenced by the degree of fineness or subdivision of the constituents. It has also been found that the pH or alkalinity of the mixture is an important factor and that the maximum colloidal characteristics of the suspension are exhibited between certain limits of alkalinity or pH values usually on the alkaline side but varying with the character and composition of the suspension.

A particularly valuable ingredient of such a suspension is an alkaline earth silicate preferably one which has been precipitated in situ. The presence of such an alkaline earth silicate markedly improves the colloidal characteristics of the suspension, as manifested in the thixotropic properties, the short time required to set up to a high yield point, and the high value of the yield point thus obtained on setting, and particularly as manifested by the ability of the suspension to form an impervious seal or coating on otherwise permeable structures.

Soluble alkaline earth compounds are in themselves frequently valuable components of such a suspension in that the alkaline earth ions by adsorption or metathesis or both exercise a very substantial effect on the colloidal character of the suspension, in general endowing the emulsion with greater plasticity or gel-like character and increasing the viscosity.

I have discovered that a material known as "treater dust" is preeminently suitable for use in such suspensions in view of its state of subdivision, its ability to influence pH, its content in soluble and/or reactive alkaline earth compounds, and for other reasons hereinafter set forth. This material is a hitherto undisposable waste product produced in the calcining kilns used in the manufacture of calcareous materials such as Portland cement, and represents the extremely fine particles and dust which are picked up by the hot combustion gases and are carried from the kiln by the movement of these gases. The exit gases are normally treated to separate and recover the dust in order to prevent contamination of the surrounding atmosphere. The dust is recovered from the gases by any suitable separating means such as an electrical precipitator, and it is the material thus separated from the exit gases which is known as "treater dust."

This treater dust has moderate hydraulic properties but has not been found useful as cement or as a constituent of cement. It has some small value as fertilizer, but for the most part it is regarded as a useless waste product. It is available in two forms, dry or wet, according to whether the dust, which is removed from the treater in dry form, is subsequently commingled with water to form a slurry.

The treater dust varies somewhat in its physical state and chemical composition according to the portion of the treater from which it is obtained, for example, the finer materials are precipitated further along in the treater than the heavier materials, and it is also somewhat variable in character according to the type of calcareous mixture being calcined in the kilns, and according to the character of the fuel and combustion gases. In general, however, the gasborne character of these materials serves to insure sufficient fineness for my purpose and when operating on calcareous materials the dust will be found to comprise calcium oxide and products of hydration or carbonation of the calcium oxide arising from the action thereon of the water and carbon dioxide present in the combustion gases, all in such proportions and combinations as make the treater dust suitable as an ingredient of suspensions as herein set forth.

The following table gives an analysis of treater dust obtained from six different places in an electrical precipitator operating on gases leaving a kiln in which raw materials for Portland cement were being calcined. The variation between these samples is doubtless associated with some slight selective effect present in the electrical precipitation, but in general all of these samples are suitable for the purpose of my invention. Samples 7 and 8 relate to wet slurries as obtained by commingling the dust with water.

Analysis (in conventional chemical terms):

|  | 1 | 2 | 3 | 4 | 5 | 6 | Moist hydraulic composition | |
|---|---|---|---|---|---|---|---|---|
|  |  |  |  |  |  |  | 7 | 8 |
| $SiO_2$ percent | 9.90 | 9.83 | 5.52 | 8.50 | 10.74 | 12.82 |  |  |
| $Al_2O_3$ do | 3.92 | }*3.72 | 2.00 | 3.26 | 3.77 | 4.57 |  |  |
| $Fe_2O_3$ do | 2.04 |  | 1.48 | 1.78 | 2.41 | 2.87 |  |  |
| CaO do | 57.98 | 53.10 | 44.79 | 54.27 | 59.58 | 57.78 |  |  |
| MgO do | 4.16 | 3.49 | 3.20 | 3.76 | 4.32 | 4.40 |  |  |
| $SO_3$ do | 4.54 | 10.09 | 14.83 | 8.45 | 2.50 | 1.37 |  |  |
| $CO_2$ do | 10.35 | 15.70 | 11.02 | 11.65 | 10.21 | 11.31 |  |  |
| $H_2O$ do | 1.71 | .10 | 1.59 | 1.40 | 1.75 | .81 | 41 | 41 |
| Alkalies by difference percent | 5.43 |  | 15.56 | 6.93 | 4.72 | 4.07 |  |  |
| Free CaO do | 27.81 |  | 20.93 | 22.60 | 30.60 | 24.27 |  |  |
| Acid insoluble do | 6.31 |  | 3.17 | 5.77 | 6.35 | 7.77 |  |  |
| Water soluble** do | 22.46 | 27.14 | 43.30 | 25.43 | 17.60 | 15.94 |  |  |
| $SO_3$ do | 3.38 | 6.19 | 12.06 | 5.45 | 1.53 | .88 |  |  |
| CaO do | 8.67 | 9.26 | 9.38 | 9.08 | 8.07 | 7.11 |  |  |
| OH- do | 5.00 | 4.62 | 5.47 | 4.90 | 4.76 | 4.49 |  |  |
| Specific gravity | 2.885 | 2.791 | 2.747 | 2.778 | 2.927 | 2.885 |  |  |
| Fineness (passing): |  |  |  |  |  |  |  |  |
| 200 mesh percent | 96.0 | 94.6 | 99.4 | 97.2 | 97.5 | 87.9 | 99.0 | 84.0 |
| 325 mesh do | 87.7 |  | 97.9 | 90.4 | 85.1 | 69.7 | 91.0 | 70.0 |

*$R_2O_3$.
**Two grams agitated with 100 cc. $H_2O$ 10 minutes, centrifuged and filtered.

```
                              Percent
CaCO3 _____ 15 ⎫
Ca(OH)2 _____  7 ⎪
CaSO4 _____  8 ⎬ Hypothetical distribution
MgCO3 _____  4 ⎪ of molecular species.
CaMg silicates and aluminates 32 ⎪
Free CaO _____ 28 ⎭
```

From these data it may be seen that the composition of treater dust differs widely from the composition of a good Portland cement. In particular the content in $SiO_2$ varies from 5.52 to 12.82%, whereas in Portland cements it customarily runs from 20 to 24%. Another striking distinction is the presence of 10.21 to 15.70% carbonate $CO_2$ in treater dust, whereas little or no $CO_2$ is present in the Portland cement. The $SO_3$ content is widely variable dependent on the type of fuel used but in general is higher than that found in Portland cement and doubtless has its origin in the oxides of sulphur present in the combustion gases which are more or less absorbed by the lime.

The treater dust is in general characterized by a low content in acid insoluble material which is advantageous in removing by acidization coatings comprising treater dust. It is further characterized by a fine state of subdivision, as is evident from the mesh test and which is advantageous in insuring the permanent suspension of these materials in water. The specific gravity of these dusts is somewhat variable but in general is substantially higher than the specific gravity of most finely divided earths, which on the average is about 2.3.

The physical and chemical data given in the above table are illustrative of typical samples of treater dust but are not intended to be limiting, and treater dusts which depart substantially from the stated characteristics are to be comprehended in my invention.

The moderate hydraulic properties of treater dust are, however, sufficient to entitle it as a hydraulic composition as shown by the following. When tested as a cement with water in accordance with the specifications of the American Society for Testing Materials, treater dust showed the following:

|  | Per cent |
| --- | --- |
| Normal consistency | 34 |
| Water used for sands | 12.2 |

|  | Setting time | |
| --- | --- | --- |
|  | Hours | Minutes |
| Initial | 0 | 15 |
| Final | 2 | 45 |

Fineness:

|  | Per cent |
| --- | --- |
| Passing 100 mesh | 100.0 |
| Passing 200 mesh | 99.6 |

Tensile strength:
Mix (1:3 standard Ottawa sand)

|  | Days | Days |
| --- | --- | --- |
| Age at test | 7 | 28 |
| Tensile strength, lbs. per sq. in | 55 | 65 |
|  | 48 | 75 |
|  | 37 | 70 |
| Average | 47 | 70 |

The composition of treater dust in terms of the molecular species present cannot, of course, be determined with accuracy, but the estimated composition in terms of the compounds present, as given in the first of the above tables, is doubtless substantially accurate. According to this tabulation treater dust is characterized as having about 32% of alkaline earth silicates and aluminates, and about 35% of lime, comprising 7% of $Ca(OH)_2$ and 28% CaO. It also contains about 19% alkaline earth carbonates, consisting of 15% of calcium carbonate and 4% of magnesium carbonate. It also contains about 8% of calcium sulphate. The alkaline earth silicates and aluminates are bracketed together as 32%, but the major proportion of this figure is properly allotted to alkaline earth silicates of the non-precipitated type such as are found in Portland cement. It is my belief that all of these materials are influential on the colloidal state of the suspension. I find that the results herein described as obtained by the use of treater dust can be in some instances approached by the use of a mixture of an alkaline earth silicate and an alkaline earth carbonate, or a mixture consisting of an alkaline earth silicate and an alkaline earth hydroxide, or by a mixture consisting of an alkaline earth silicate and an hydroxide and carbonate of an alkaline earth metal. It is accordingly an object of my invention to provide such sub-combinations, but in general I prefer to use treater dust and I do not wish to be understood as implying that the effectiveness of treater dust is necessarily limited to the coaction of the alkaline earth carbonates, silicates, and hydroxides (or oxides) present therein. For instance, it may be that the calcium sulphate present in treater dust may have an effect somewhat similar to its known effect in retarding the setting of Portland cement. Furthermore, the various components of treater dust may be present in far more complicated compounds than those indicated, the effect of which could not be duplicated by a simple mixture corresponding to the analyses.

I propose to use treater dust in suspensions either alone or in admixture with finely divided earths, weighting or bodying agents, modifying agents, or combinations thereof. By "finely divided earths" I have reference to finely divided material such as artificial or natural hydrous aluminum silicates, bentonite, either thixotropic or non-thixotropic, and various commercially produced products thereof, well site borrow, or imported borrow such as Mojave mud, Nigger Slough mud, and the like, Georgia or Florida fuller's earths, clays or bentonites, either naturally occurring or as commercially processed and modified, natural clay, diatomite, either naturally occurring or as commercially processed and modified, and the like.

By "weighting" or "bodying" agents I have reference to solids or salts which will increase the specific gravity of the suspension or improve its body, such as barytes, naturally occurring or commercially processed and modified, zinc chloride, lead sulphide, lead oxide, aluminum chloride, iron chloride, iron oxide, calcium sulphate, gypsum, calcium carbonate, magnesium carbonate, and the like.

By "modifying agents" I have reference to materials capable of altering the colloidal character of suspensions comprising treater dust, for example, agents which may act with regard to the neutralization of excess alkalinity as occasioned by the presence of lime or other strongly alkaline material, or which may act to inhibit the effects of the excess alkalinity on the colloidal character of the suspension, or which may react with alkaline earth ions to form an insoluble or un-ionized alkaline earth compound. In particular I contemplate as modifying agents materials of acidic reaction such as acids or acid anhydrides, for example carbon dioxide, acidic salts such as amphoteric materials such as lead oxide, ferric chloride, and the like; materials forming insoluble alkaline earth compounds such as carbonates and phosphates; materials forming un-ionized calcium compounds, in particular various sugars and sugar containing substances such as sucrose or raw sugar and molasses, these last two classes of materials being characterized by their ability to decrease the concentration of alkaline earth ions in the dispensing medium, as well as their ability to modify the pH and organic colloids in the form of various carbohydrates and proteins such as starch, wheat flour, animal glue, casein and formaldehyde which apparently act either to reduce the excess alkalinity or at least to inhibit the effects thereof on the colloidal properties of the suspension. In particular I contemplate the use of a modifying agent such as a soluble alkali silicate which will not only react with the alkaline earth ions to form an insoluble alkaline earth compound, but which also in so doing gives rise to a precipitated alkaline earth silicate having pronounced effects on the colloidal character of the suspension.

It is an object of this invention to provide a drilling mud comprising an aqueous suspension of a hydraulic composition in the form of treater dust.

It is a further object of this invention to provide a thixotropic suspension such as drilling mud comprising treater dust as modified by the action of a soluble silicate.

It is a further object of this invention to provide a drilling mud comprising treater dust and modifying agents as above described.

It is a further object of the invention to provide a drilling mud comprising weighting or bodying materials and treater dust.

It is still a further object of the invention to provide a drilling mud comprising treater dust and finely divided earths.

It is furthermore an object of the invention to provide a drilling mud comprising treater dust in which any of the mentioned adjuncts, separately or in combination, are present in such quantity as to endow the suspension with suitable viscosity, yield point, thixotropic properties, formation sealing properties, and susceptibility to acidization as are required for its efficient use as a drilling mud.

It is furthermore an object of the invention to provide processes whereby such mixtures may be formed and compounded to give the desired qualities.

The extremely fine state of subdivision of this treater dust, as assured by its air-borne character, provides various advantages, among which is the physical effect arising from the presence of colloidal particles, and the chemical effect arising from the fact that the soluble or reactive materials are present in such finely divided form that their rate of reaction is extremely rapid so that true equilibrium may be readily obtained in the compounding of the suspension, or in the subsequent modification thereof, or in the destruction of the colloidal character by acid as in the acidization process previously described.

It is accordingly an object of the invention to provide an ingredient for suspension of the type described in which said ingredient is characterized by its content of colloidally sized particles, and by its ability to rapidly attain chemical equilibrium with other components of the suspension.

A further advantage provided by the treater dust arises from the fact that the specific gravity of this material, namely, 2.9, is substantially higher than the apparent specific gravity of natural earth as found in mud or as used to compound mud, for example, argillaceous earth, Mojave mud, bentonite, and the like, the apparent specific gravity of which in practice usually runs around 2.3. The use of treater dust, therefore, by itself or in combination with other materials, results in a suspension of considerably greater density than ordinary mud and is of great value in maintaining pressure and preventing blow-outs during drilling. Furthermore, in compounding suspensions of still higher specific gravity, it is not necessary to add as much weighting agent, for example, barites, or hematites, to arrive at a given density when treater dust replaces a part or all of the earth as normally used.

A suspension of 5 to 50% of treater dust in water exhibits good colloidal properties in that it is fairly viscous, tends to set up on quiescent standing, and further is effective in sealing pervious structures by depositing thereon a relatively impervious coating or filter cake. If desired, the specific gravity of such a suspension may be increased by incorporating therein suitable amounts of finely divided heavy solids such as barites or hematites, or by incorporating therein water-soluble weighting agents such as zinc chloride and the like.

Coatings laid down by a suspension comprising treater dust are particularly susceptible to removal by inorganic acids such as HCl in view of the fact that the lime, the calcium carbonate, and even the calcium aluminates and silicates, are readily made soluble by the action of the inorganic acid, and in particular by the effect of the calcium carbonate which evolves carbon dioxide in the presence of the acid, causing substantial effervescence and agitation. There may be still other factors, however, contributing to the peculiar sensitivity to acidization of this material and the ease with which such coatings may be removed, and I do not wish to be bound by any theory or explanation of this effect.

I find that I am able to control the colloidal character of the suspension containing the treater dust by the addition of various of the modifying agents or combination thereof so as to achieve a desirable balance of the various characteristics of the mud, for example, viscosity, yield point, thixotropic properties, sealing properties, and the like, and I am thereby able to adjust the mud to an optimum condition for a given use, which will vary according to drilling conditions and the like. For example in drilling through what is known as heaving shale, the sealing property of the mud becomes of extreme importance in that any egress of water from the mud to the formation results in the heaving of the latter and consequent obstruction or even stoppage of the hole. Under other conditions, other characteristics of the mud may become of greater importance; for instance, where there is substantial danger of gas cutting, it is necessary to maintain the mud at a relatively low level of viscosity. By the addition of suitable amounts of suitable modifying agents I am able to bring one or the other of these characteristics of the mud into the desired degree of prominence according to the conditions under which the mud is to be used. These modifying agents may be used in conjunction with the treater dust alone, or may be used with suspensions containing both treater dust and a finely divided earth, for example, bentonite. In the latter instance, there may also be mutual modifying effects between the treater dust and the admixed earth so that the quantity and character of the modifying agent to be used are not only dependent upon their effect on the treater dust, but also their effect on the admixed earth and such further compounds or associations as may be formed by the interaction of the treater dust and the earth.

Accordingly, the character and quantity of the modifying agent may be greatly varied according to the results which it is desired to accomplish, and also according to the character of the suspension which is being compounded.

It is difficult to generalize as to the effects produced by these modifying agents because in the complex mixtures which may be afforded by the combination of treater dust with natural earths, weighting and bodying agents and one or more modifying agents, the effect of still another modifying agent may be an exception to the general rule based on its effects on simpler mixtures. However, in at least most instances, the effect of adding treater dust to a natural mud or to a suspension of a natural earth is to increase the viscosity or body and to increase the thixotropic properties of the suspension. In general the effect of adding a modifying agent of the kind described is to increase the sealing properties of the suspension. The effect of adding an alkali water-soluble silicate to a suspension containing treater dust is in substantially all instances to greatly improve its colloidal properties, particularly as regards its body, thixotropic properties, ability to suspend particles, and its ability to form an impervious coating.

In general the effect of adding an organic colloid is an improvement in the degree of deflocculation of the mud and such an addition serves to enhance the colloidal characteristics of the suspension, particularly its ability to form impervious coatings and to set up to a gel on quiescent standing.

The addition of acids or acidic salts or other acidic reagents is of value when the suspension has undergone partial flocculation due to excessive alkalinity. Under these circumstances the neutralization of the excess alkali afforded by these reagents results in greater deflocculation with consequent reduction in viscosity and improvement in sealing characteristics.

The bodying or gel-producing effect which the treater dust has on suspensions of various earths, even where the suspension exhibits little or no thixotropic properties before combination with the treater dust, may be modified or diminished when desirable by the addition of modifying agents capable of reacting with the alkaline earth ions, as set forth above. In most instances the effect of the modifying agent in reacting with the alkaline earth ions to convert them into an insoluble or un-ionized form, is to reduce the viscosity, body, yield point, and thixotropic character of the suspension, and in most instances to improve the sealing properties of the suspension. An important exception to this, as noted above, is where the alkaline earth precipitate is in itself colloidal and thereby gives rise to secondary effects as in the case of precipitating the alkaline earth with an alkali silicate. In this latter instance the sealing properties, viscosity, and thixotropic properties are usually all increased.

A further method of control useful in the compounding of satisfactory muds comprising treater dust is the variation of the ratio of the water to solid, and in general the dilution with water will decrease the viscosity and specific gravity of the suspension.

The relative proportions of the various ingredients may be varied widely according to the ingredients used and the desired character of the resulting suspension. In using treater dust alone to form an aqueous suspension I may use from 5% up to 50% or more of treater dust in the water. In using a combination of treater dust and sodium silicate to produce a suspension suitable as a rotary drilling fluid, the following compositions are suitable, although they may be widely departed from, dependent upon the desired character of the resulting suspension.

| Treater dust as described grams | 450 | 600 | 750 | 900 |
| Water cc | 2580 | 2430 | 2280 | 2130 |
| Sodium silicate, 40% solution cc | 30 | 30 | 30 | 30 |

Characteristics of produced rotary drilling fluid:

| Specific gravity | 1.130 | 1.176 | 1.223 | 1.269 |
| Weight per cubic foot lbs | 70.5 | 73.4 | 76.3 | 79.2 |
| Marsh viscosity seconds | 21 | 22 | 25 | 30 |

The following are typical examples of a rotary drilling fluid containing treater dust, sodium silicate, and wheat flour:

| Treater dust as described grams | 450 | 450 |
| Water cc | 1065 | 1500 |
| Sodium silicate, 40% solution cc | 75 | 133 |
| Starch (wheat flour) grams | 25 | 25 |

Characteristics of produced rotary drilling fluid:

| Viscosity (Marsh) seconds | 50 | 31 |
| Weight per cubic foot pounds | 80 | 73 |

When using treater dust in conjunction with finely divided earths, the proportion of treater dust may vary from 1% or 2% of the earth to 50% or more. In general I find that from 3% to 10% of treater dust based on the earth serves to very materially increase the colloidal properties of the suspension of the earth.

The quantity of modifying agent which may be used in conjunction with the treater dust may be small or large dependent on the character of the desired product, but in general I prefer to use no more modifying agent than is necessary to give the requisite colloidal characteristics.

The suspensions can be made by agitating or dispersing the treater dust in water and thereafter adding other ingredients if desired and continuing the agitation until a suitable dispersion has been obtained. Alternatively, I can mix the ingredients dry and disperse this dry mixture in water by suitable agitation. I find it particularly advantageous to prepare admixtures of the treater dust with dry non-hygroscopic materials such as starch, whereby the hygroscopic qualities of the treater dust are diminished and a mixture is obtained which is more stable during storage under moist conditions. It is accordingly an object of my invention to provide a dry mixture comprising treater dust or modified treater dust, and which is adapted to be suspended or dispersed in water. Again, the ingredients other than the treater dust may be dissolved or dispersed in water and the treater dust then dispersed in the suspension by suitable agitation, as by stirring or pumping. When using a modifying agent I usually prefer to first prepare a suspension of treater dust or treater dust and a finely divided earth in water and then add the modifying agent to the suspension thus prepared. For instance, I may disperse 20 to 30% of treater dust in water and then add a suitable quantity of a soluble alkali silicate, and thereafter flour, continuing the agitation during the preparation. When using sugar or molasses as the modifying agent, I find it advantageous to dissolve this material in the water, or in water containing suspended inert earths if it is desired to utilize the latter, and thereafter to disperse the treater dust in the solution or suspension thus formed, allowing the dispersion thus formed to age with or without further agitation until the reaction is complete.

The following example is illustrative of a process adapted for the incorporation of starch as a modifying agent. 450 grams of treater dust were dispersed in 1000 cc. of water, and 133 cc. of 40% sodium silicate solution were added with agitation. Agitation was continued for 10 minutes thereafter, whereupon 500 cc. of an aqueous paste containing 5% of wheat flour was added to the mixture. Agitation was continued from 5 to 10 minutes longer or until desired gel properties were exhibited. The dispersion thus formed weighed 73 pounds per cubic foot and had a Marsh viscosity of 31 seconds. This dispersion had excellent sealing properties. When a similar dispersion was prepared by adding the flour paste prior to the sodium silicate, an emulsion having somewhat less pronounced sealing properties was obtained.

It will be clear that various changes and modifications can be made without departing from the scope of the appended claims.

I claim as my invention:

1. An aqueous drilling fluid comprising a hydraulic composition containing treater dust as hereinabove described.

2. A drilling fluid comprising an aqueous suspension of a finely divided earth and a hydraulic composition, said hydraulic composition being treater dust as hereinabove described.

3. As a composition of matter, an aqueous suspension comprising treater dust and an organic colloid.

4. As a composition of matter an aqueous suspension comprising treater dust modified by a modifying agent adapted to react with ions of an alkaline earth to form un-ionized water-soluble compounds of said alkaline earth, whereby the concentration of said ions in the dispersing water is reduced.

5. As a composition of matter an aqueous suspension comprising treater dust modified by a modifying agent adapted to react with and precipitate alkaline earth ions and thereby to decrease the concentration of alkaline earth ions in the dispersing medium.

6. As a composition of matter an aqueous suspension comprising treater dust modified by a modifying agent adapted to neutralize at least partially the alkalinity of the treater dust, said agent being selected from the class consisting of acids, acid anhydrides, and acidic salts.

7. As a composition of matter an aqueous suspension comprising treater dust modified by an alkali silicate.

8. As a composition of matter an aqueous suspension comprising treater dust modified by an alkali silicate and a modifying agent selected from the class consisting of proteins and carbohydrates.

9. A composition of matter comprising treater dust and finely divided earthy material and adapted to form a suspension with water.

10. A composition of matter comprising treater dust and an organic colloid and adapted to form a suspension with water.

11. A composition of matter comprising treater dust and an alkali silicate.

12. In the art of boring or controlling wells, the process comprising: forming an aqueous suspension containing treater dust and introducing the suspension into the well.

13. In the art of boring or controlling wells, the process comprising: introducing into the well an aqueous suspension of finely divided solids and controlling the colloidal properties of the suspension by the addition of treater dust.

14. A process for the manufacture of suspensions comprising: agitating treater dust in water.

15. A process for the manufacture of suspensions comprising: agitating a mixture of treater dust and finely divided earth with water.

16. A process for the manufacture of suspensions comprising: agitating a major proportion of a finely divided earth and a minor proportion of treater dust with water sufficient to make a fluid suspension.

17. A process for the manufacture of suspensions comprising: subjecting treater dust dispersed in water to the action of an alkali silicate.

18. A process for the manufacture of suspensions comprising: subjecting treater dust dispersed in water to the action of an alkali silicate, thereby forming a dispersed precipitated alkaline earth silicate and caustic alkali, and adding a material adapted to react with said caustic alkali and neutralize in part at least the effects of excess alkalinity on the colloidal properties of the suspension.

19. A process for the manufacture of suspensions comprising: subjecting treater dust dispersed in water to the action of a dissolved sugar, thereby obtaining a soluble non-ionized calcium sucrate.

20. As a composition of matter an aqueous suspension comprising treater dust and a weighting agent.

CHARLES S. HOWE.